United States Patent
Cornette et al.

[11] Patent Number: 6,116,573
[45] Date of Patent: Sep. 12, 2000

[54] PACKING SYSTEM FOR VALVES

[75] Inventors: Kevin R. Cornette, Francisville, La.; Scott Osamu Ganaja, San Luis Obispo, Calif.

[73] Assignee: Cornette Technology, LLC, Jackson, Miss.

[21] Appl. No.: 09/218,146

[22] Filed: Dec. 22, 1998

[51] Int. Cl.$^7$ ............................................. F16K 31/44
[52] U.S. Cl. ............................................. 251/214; 277/510
[58] Field of Search ........................ 251/214; 277/510, 277/511, 519, 520, 525, 529, 531, 534

[56] References Cited

U.S. PATENT DOCUMENTS

| | | |
|---|---|---|
| 31,512 | 2/1861 | Gould . |
| 458,453 | 8/1891 | Goodrich . |
| 779,700 | 1/1905 | Fogh . |
| 975,045 | 11/1910 | Johnson . |
| 1,052,726 | 2/1913 | King . |
| 1,068,337 | 7/1913 | Hahn . |
| 1,211,476 | 1/1917 | Miller . |
| 1,329,165 | 1/1920 | Drew . |
| 1,557,945 | 10/1925 | Schlotter et al. . |
| 1,576,376 | 3/1926 | Sudekum . |
| 1,605,976 | 11/1926 | Osborn . |
| 1,704,152 | 3/1929 | Stephens et al. . |
| 1,798,268 | 3/1931 | Mellor . |
| 1,879,988 | 9/1932 | Morton et al. ......................... 277/510 |
| 1,914,741 | 6/1933 | Gysling ................................. 277/529 |
| 1,955,831 | 4/1934 | Raybould . |
| 2,050,620 | 8/1936 | Mason . |
| 2,385,156 | 9/1945 | Newell . |
| 2,417,799 | 3/1947 | Seaver . |
| 2,902,302 | 9/1959 | Ackermann . |
| 2,968,505 | 1/1961 | Scaramucci ........................... 277/525 |
| 3,004,783 | 10/1961 | Webb . |
| 3,218,087 | 11/1965 | Hallesy . |
| 3,295,856 | 1/1967 | Bredtschneider et al. . |
| 3,337,223 | 8/1967 | Nusbaum . |
| 3,468,566 | 9/1969 | Nietzel . |
| 3,857,410 | 12/1974 | Bedo et al. . |
| 3,975,026 | 8/1976 | Boyle et al. . |
| 4,046,389 | 9/1977 | Holzenberger . |
| 4,256,317 | 3/1981 | Havens et al. . |
| 4,468,039 | 8/1984 | Le et al. . |
| 4,516,752 | 5/1985 | Babbitt et al. . |
| 4,623,152 | 11/1986 | St. Jean . |
| 4,892,320 | 1/1990 | Tückmantel . |
| 5,049,031 | 9/1991 | Mintenko et al. . |
| 5,476,271 | 12/1995 | Hatting et al. . |
| 5,524,902 | 6/1996 | Cornette . |

FOREIGN PATENT DOCUMENTS

| | | |
|---|---|---|
| 173852 | 9/1905 | Germany . |
| 1007585 | 5/1957 | Germany . |
| 9836 | 3/1902 | United Kingdom . |
| 330091 | 6/1930 | United Kingdom . |
| 606121 | 8/1948 | United Kingdom . |
| 2058247 | 4/1981 | United Kingdom . |

*Primary Examiner*—Steven O. Douglas
*Assistant Examiner*—Huyen Le
*Attorney, Agent, or Firm*—Richard C. Litman

[57] ABSTRACT

A packing system for valves includes a preformed packing, an upper packing cup, a lower packing cup, and a threaded bushing or a gland yoke capable of capturing the upper packing cup when the system is installed in a stuffing box. The preformed packing includes an inner cylindrical shell surrounded by an outer cylindrical shell. Two evenly spaced perforated metal sheets are provided intermediate the inner and outer cylindrical shells. The preformed packing is compressed between the upper and lower packing cups to form a tight seal around a shaft passing through the stuffing box. When the preformed packing is compressed, the perforated metal sheets engage the upper and lower packing cups. When replacing the preformed packing, simply lifting the upper packing cup away from the stuffing box will also cause the preformed packing to be lifted out of the stuffing box.

18 Claims, 11 Drawing Sheets

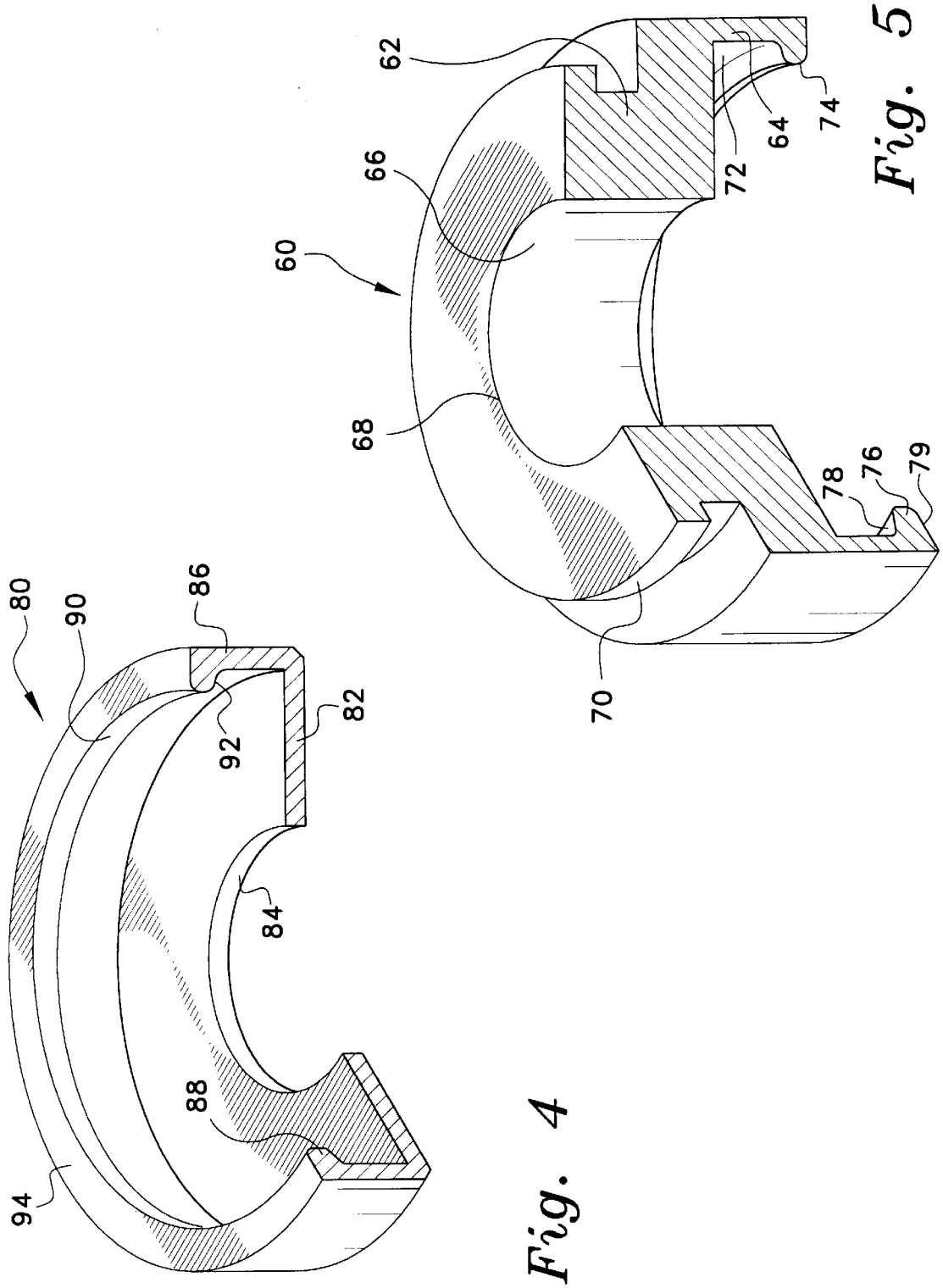

PACKING SYSTEM FOR VALVES

BACKGROUND OF THE INVENTION

1. Field of the Invention

The present invention relates to a packing system including a preformed packing for packing the stuffing-box of valves used for controlling the flow of fluids.

2. Description of the Related Art

Valves used for controlling the flow of fluids typically have a valve stem that passes into the body of the valve or valve housing. The stem is linked to a gate or other movable member located within the valve housing. The gate seats against valve seats provided in the valve housing to shut off the flow of fluid. Fluid flows through the valve when the gate is moved away from its seats by the action of the valve stem. At this time fluid can leak out of the valve through the opening which allows the stem to pass into the valve housing. Typically a stuffing box is provided around the opening for the valve stem. This stuffing box is packed with packing material, typically a stack of packing rings. A gland follower or a gland nut is then used to crush the packing down in the stuffing-box to provide a positive seal around the valve stem.

The conventional method of preventing leakage around the valve stem suffers from a number of drawbacks. Foremost among these drawbacks is that the old method of replacing the packing is time consuming and tedious, requiring the loosening of the gland fasteners, removing the yoke, removing the gland follower, removing the old packing using packing picks and pullers, and using a flashlight and mirror to check the stuffing-box for cleanliness. Also, the valve must be disassembled to allow replacement of the packing rings around the valve stem.

To overcome the drawbacks enumerated above alternative methods and arrangements for valve packing have been proposed in the prior art.

U.S. Pat. No. 31,512, issued to John H. Gould on Feb. 19, 1861, shows a metal alloy packing for the stuffing box of the piston rod of a steam engine. The packing of Gould is in the form of a metal alloy cylinder having a flange at each end.

U.S. Pat. No. 458,453, issued to Addison Goodrich on Aug. 25, 1891, shows a packing extractor resembling a hollow nut which is inserted into a stuffing-box before the packing is inserted. The packing is actually contained in the extractor which allows easy removal of the packing.

U.S. Pat. No. 975,045, issued to Wills Johnson on Nov. 8, 1910, shows a removable stuffing box which uses conventional packing.

U.S. Pat. No. 1,052,726, issued to Charles W. G. King on Feb. 11, 1913, shows a packing material that incorporates a perforated metal sheet. The packing material of king is in the form of segments with tapered ends. When such segments are wrapped around a shaft, the tapered ends overlap to form a joint. Perforated metal sheets are used to reinforce the tapered ends and thus keep them from breaking.

U.S. Pat. No. 1,211,476, issued to Norman Bruce Miller on Jan. 9, 1917, shows a packing material that is in sheet form. Right triangular pieces of the sheet are glued along their hypotenuse and then rolled to form packing material.

U.S. Pat. No. 1,557,945, issued to Charles A. Schlotter et al. on Oct. 20, 1925, shows a packing ring that is diagonally split and has an inner perforated metal ring for support.

U.S. Pat. No. 1,798,268, issued to John Mellor on Mar. 31, 1931, shows a packing material composed of a compressible metal ring filled with a compressible lubricating material.

U.S. Pat. No. 2,050,620, issued to Frank N. Mason on Aug. 11, 1936, shows a packing ring composed of a compressible metal ring filled with a compressible packing material and having a pair of copper bearing rings along an inner circumference thereof.

U.S. Pat. No. 2,417,799, issued to Donald A. Seaver on Mar. 18, 1947, shows a gland nut for compressing packing material in a stuffing box.

U.S. Pat. No. 5,476,271, issued to Paul Hatting et al. on Dec. 19, 1995, shows a packing material in the form of a metal bellows.

U.S. Pat. No. 5,524,902, issued to Kevin R. Cornette on Jun. 11, 1996, shows a packing material having tapered ends which is adhesively attached to a gland nut. U.S. Pat. No. 5,524,902, which is incorporated herein by reference, lists a voluminous number of references relating to the art of sealing around movable shafts.

None of the above inventions and patents, taken either singly or in combination, is seen to describe the instant invention as claimed. In particular, none of the above inventions and patents describe a preformed packing having an inner cylindrical shell surrounded by an outer cylindrical shell with the inner cylindrical shell extending for some distance beyond both ends of the outer cylindrical shell.

SUMMARY OF THE INVENTION

The present invention relates to a preformed packing material for sealing gaps around a shaft, in particular the gaps that exist around a valve stem. The invention also encompasses a packing system for packing stuffing boxes which uses the preformed packing referenced above. The preformed packing includes an inner cylindrical shell and an outer cylindrical shell surrounding the inner cylindrical shell. Two evenly spaced perforated metal sheets are provided intermediate the inner and outer cylindrical shells. In addition to the preformed packing described above, the packing system of the present invention further includes an upper packing cup, a lower packing cup, and a threaded bushing or gland yoke capable of capturing the upper packing cup when the system is installed in a stuffing box. The preformed packing is compressed between the upper and lower packing cups as the threaded bushing or gland yoke is tightened down toward the bottom of the stuffing box, thus forming a tight seal around a shaft passing through the stuffing box. When the preformed packing is compressed, the perforated metal sheets engage the upper and lower packing cups. Thus when the need for replacement of the preformed packing arises, simply lifting the upper packing cup away from the stuffing box will also cause the preformed packing to be lifted out of the stuffing box, thereby providing for the easy replacement of the preformed packing.

Accordingly, it is a principal object of the invention to provided a preformed packing for packing a stuffing box that can be replaced easily and without the need to disassemble the structure of which the stuffing box is a part.

It is another object of the invention to provide a packing system that allows a preformed packing to be extracted from a stuffing box without the need for specialized tools.

It is a further object of the invention to provide a packing system, using a preformed packing, which can easily be retrofitted to existing valves.

Still another object of the invention is to provide a packing material that lasts far longer than conventional packing.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a cutaway perspective view of the lower packing cup.

FIG. 5 is a cutaway perspective view of the upper packing cup.

Similar reference characters denote corresponding features consistently throughout the attached drawings.

DETAILED DESCRIPTION OF THE PREFERRED EMBODIMENTS

Figure 1:
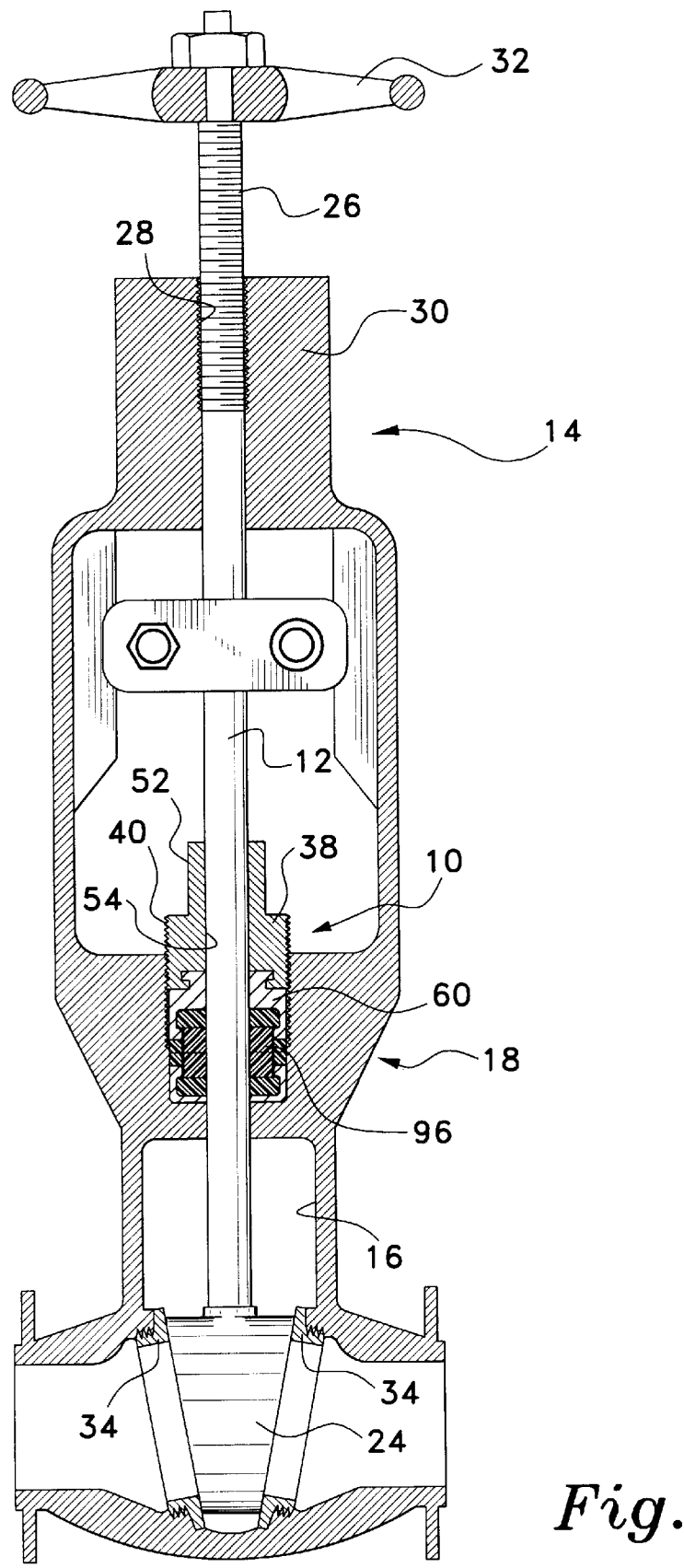
FIG. 1 is a cross sectional view of a gate valve incorporating the gland packing system of the present invention.
Figure 2:
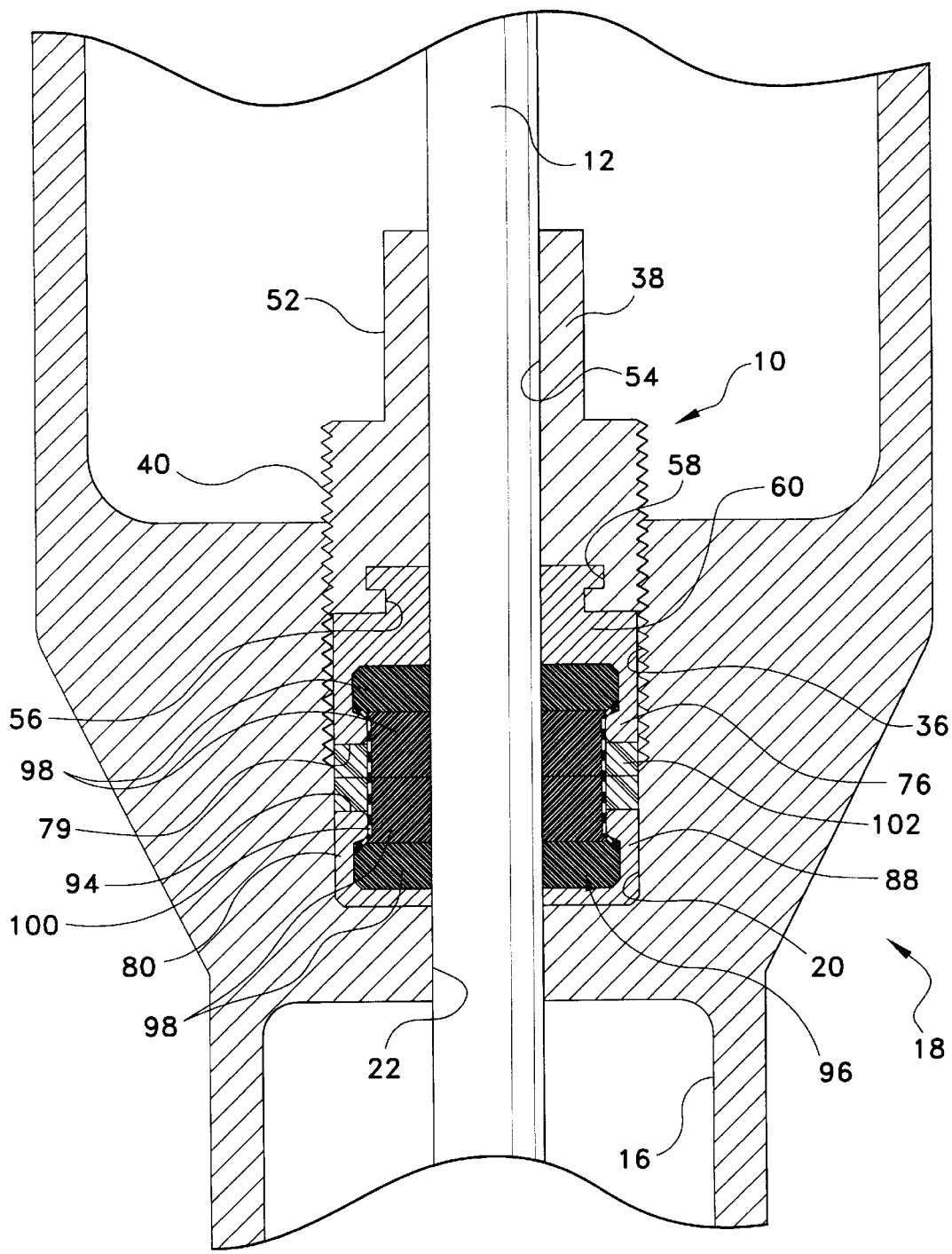
FIG. 2 is a fragmentary, enlarged cross sectional view showing the gland packing system of the present invention in greater detail.

Referring to FIGS. 1–6, the present invention is directed to a packing system 10 for providing a seal around a valve stem 12. Referring to FIGS. 1 and 2, a valve 14 is shown incorporating the packing system of the present invention. The portion of the valve constituting the sealing mechanism for sealing the inside of the valve body 16 from the atmosphere, is known as the gland 18. The gland includes a stuffing-box 20. The stuffing-Box has a central opening 22 through which the valve stem 12 passes. The end of the valve stem 12, within the valve body 16, is attached to a gate 24. A threaded portion 26 of the valve stem 12 matingly engages threads 28 in the valve bonnet 30. Turning the hand wheel 32 moves the stem 12, and the attached gate 24, up and down within the valve body 16. The valve 14 is closed when the gate 24 is seated firmly against the valve seats 34 and thus prevents fluid flow through the valve. Turning the hand wheel 32 counterclockwise raises the valve stem 12, and consequently the gate 24, within the valve body 16, thus opening valve 14. To allow relatively free movement of the valve stem 12, relative to the valve body 16, some clearance must be provided between the valve stem 12 and the central opening 22. When the valve 14 is open, fluid under pressure fills the valve body 16. Because of the clearance between the valve stem 12 and the central opening 22, fluid filling the valve body 16 can leak out around the valve stem 12. As will be explained below, the packing system 10 forms a seal around the valve stem 12 which prevents such leaks.

Figure 3:
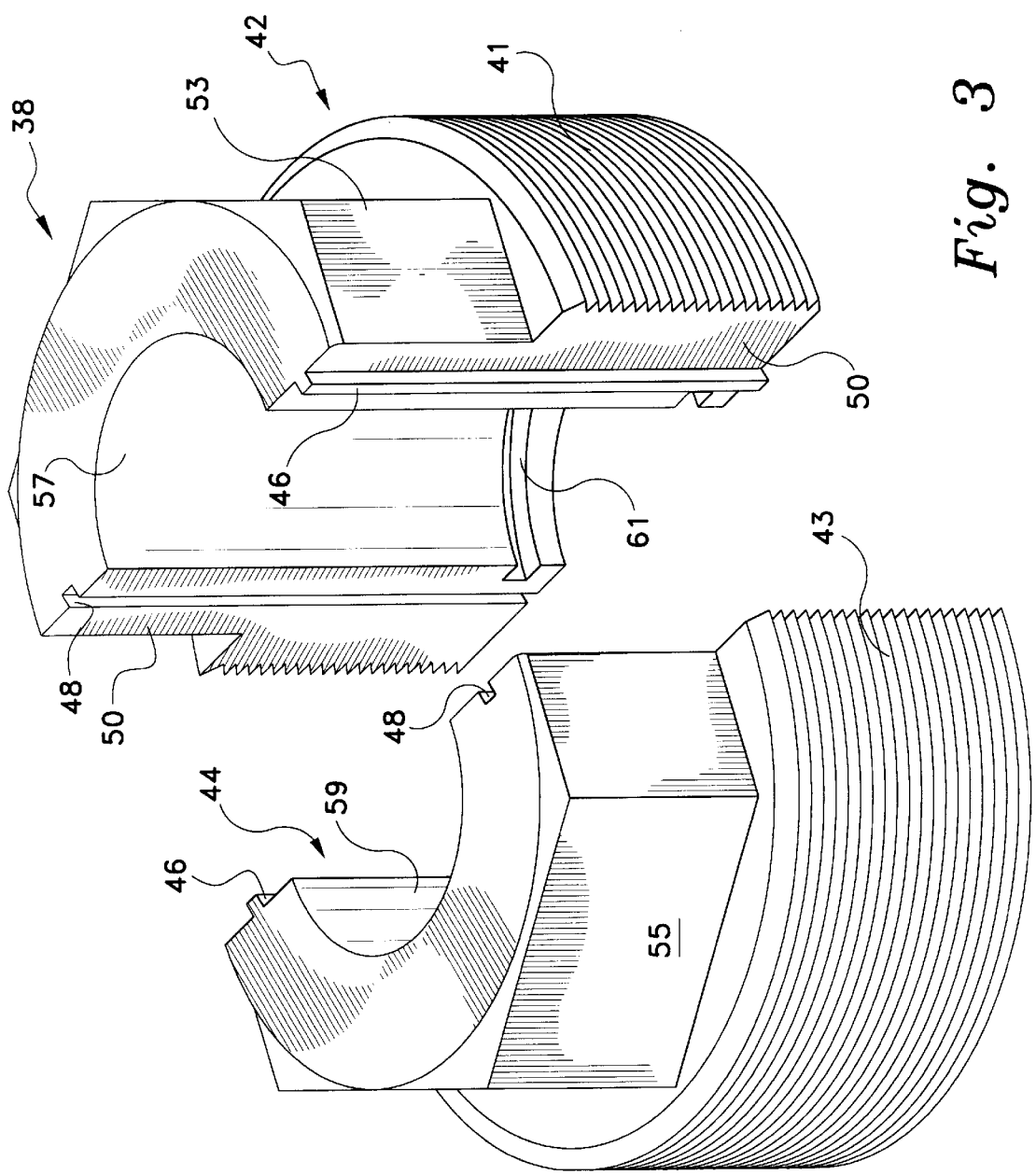
FIG. 3 is an exploded perspective view of the threaded bushing used to compress the packing material.

The stuffing-box 20 forms a cavity which immediately surrounds the valve stem 12 for some distance as the valve stem 12 emerges from the interior of the valve body 16 through the central opening 22. The stuffing-box 20 has internal female threads 36 provided on its sidewall. The threaded bushing 38 has male external threads 40 which matingly engage the female threads 36 of the stuffing-box 20. Referring to FIG. 3, the threaded bushing 38 is split into two complementary halves 42 and 44. Each of the threaded bushing halves 42 and 44 has a raised rib 46. Also, each of the threaded bushing halves 42 and 44 has a groove 48. When the threaded bushing halves 42 and 44 are assembled to form the threaded bushing 38, the rib 46 of the bushing half 42 fits into the groove 48 of the bushing half 44 and the rib 46 of the bushing half 44 fits into the groove 48 of the bushing half 42. To assemble the bushing halves 42 and 44 into the threaded bushing 38, the cross sectional surfaces 50 of the bushing halves 42 and 44 are brought into abutting contact with one another, with the rib 46 of each of the bushing halves 42 and 44 fitting into the groove 48 of the other bushing half. Because the cross sectional surface 50 of the bushing half 44 is essentially identical to that of the bushing half 42, only the cross sectional surface 50 of the bushing half 42 is shown in the attached drawings.

As previously indicated, the threaded bushing 38 has male threads 40 on its external surface. Half the threaded surface 40, designated by reference numeral 41, is formed on the exterior of the threaded bushing half 42, while the other half of the threaded surface 40, designated by reference numeral 43, is formed on the exterior of the threaded bushing half 44. With the threaded bushing halves 42 and 44 mated together, the exterior surfaces 41 and 43 form the screw threaded surface 40. A first end of the threaded bushing 38 is provided with a hex head 52. The threaded bushing half 42 has a hex head portion 53 which together with the hex head portion 55, of the threaded bushing half 44, form the hex head 52. The hex head 52 facilitates the use of a wrench for tightening the threaded bushing 38 within the stuffing-box 20.

Extending through a substantial portion of the length of the threaded bushing 38 is a central passage 54. Referring to FIG. 3, the threaded bushing half 42 has a half a cylindrical surface 57 which together with the half a cylindrical surface 59, of the threaded bushing half 44, form the central passage 54. The passage 54 extends along the central longitudinal axis of the threaded bushing 38. The passage 54 has a diameter large enough for the valve stem 12 to pass therethrough. Preferably, the diameter of the passage 54 is slightly larger than the outside diameter of the valve stem 12 so that the valve stem 12 can rotate without interference from the threaded bushing 38. The end of the threaded bushing distal from the hex head 52, has an opening 56 which is in communication with the passage 54 such that the valve stem 12 can pass through the entire length of the threaded bushing 38. The opening 56 has a diameter larger than the diameter of the central passage 54. An annular groove 58 is provided intermediate the passage 54 and the opening 56. The half groove 61, formed in the threaded bushing half 42, constitutes half of the annular groove 58. The other half of the annular groove 58 is formed in the threaded bushing half 44 and is not shown in the illustrations, being identical to half groove 61.

The packing system 10 further includes an upper packing cup 60. Referring to FIG. 5, the upper packing cup 60 has a small diameter portion 62 and a large diameter portion 64. The small diameter portion 62 has a central passage 66 extending therethrough. The passage 66 is essentially cylindrical and extends along the central longitudinal axis of the upper packing cup 60. The passage 66 has a diameter large enough for the valve stem 12 to pass therethrough. Preferably, the diameter of the passage 66 is slightly larger than the outside diameter of the valve stem 12 so that the valve stem 12 can rotate without interference from the upper packing cup 60. The small diameter portion 62 has an opening 68 located distal from the large diameter portion 64. The opening 68 is contiguous with the passage 66 and has the same diameter as the passage 66. Extending radially outward from the small diameter portion 62, and located proximate the opening 68, is a flange 70. The flange 70 is dimensioned to fit into the groove 58 of the threaded bushing 38. Also the outside diameter of the small diameter portion 62 is sized to fit through the opening 56 of the threaded bushing 38.

The large diameter portion 64 has a bore 72 which is larger in diameter than the passage 66. The bore 72 is contiguous and concentric with the passage 66 so as to allow the valve stem 12 to pass completely through the upper packing cup 60. The large diameter portion 64 has an opening 74 located distally from the small diameter portion 62. The opening 74 is defined by a flange 76 which projects radially inward toward the longitudinal axis of the upper packing cup 60. The longitudinal axis of the upper packing cup as defined herein is the axis passing through the centers of both the openings 68 and 74. The flange 76 has a surface 78 which faces toward the small diameter portion 62. The surface 78 is beveled such that the flange 76 is thicker at its base relative to the thickness of the flange 76 at the opening 74. The surface 79 of the flange 76 is essentially flat and faces away from the small diameter portion 62. Further, the surface 79 substantially lies in a plane that is perpendicular to the longitudinal axis of the upper packing cup 60. The surface 79 is essentially flat in the sense that for the most part it is flat except for its corners which may be rounded to avoid sharp edges and thus avoid causing injury during handling. Similarly, the surface 79 substantially lies in a single plane in the sense that any rounded corners would not lie in the same plane as the flat portion of the surface 79.

The packing system 10 further includes a lower packing cup 80. Referring to FIG. 4, the lower packing cup 80 has a bottom 82. The bottom 82 has a through hole 84 which allows the valve stem 12 to pass through the lower packing cup 80. The lower packing cup 80 further includes an annular peripheral wall 86 which extends perpendicularly from the bottom 82. The rim of the wall 86, distal from the bottom 82, is provided with a flange 88 which projects radially inward toward the longitudinal axis of the lower packing cup 80. The longitudinal axis of the lower packing cup as defined herein is the axis passing through the center of the hole 84 and coincident with the longitudinal axis of the valve stem 12 when the packing system 10 is assembled within the valve 14. The apical rim of the flange 88 defines an opening 90 located distally from the through hole 84. The diameter of the opening 90 is larger than the diameter of the hole 84. Thus the valve stem 12 can extend through the entire length of the lower packing cup 80 after assembly. The flange 88 has a surface 92 which faces toward the hole 84. The surface 92 is beveled such that the flange 88 is thicker at its base relative to the thickness of the flange 88 at the opening 90. The surface 94 of the flange 88 is essentially flat and faces away from the bottom 82. Further, the surface 94 substantially lies in a plane that is perpendicular to the longitudinal axis of the lower packing cup 80. The surface 94 is essentially flat in the sense that for the most part it is flat except for its corners which may be rounded to avoid sharp edges and thus avoid causing injury during handling. Similarly, the surface 94 substantially lies in a single plane in the sense that any rounded corners would not lie in the same plane as the flat portion of the surface 94.

Figure 6:
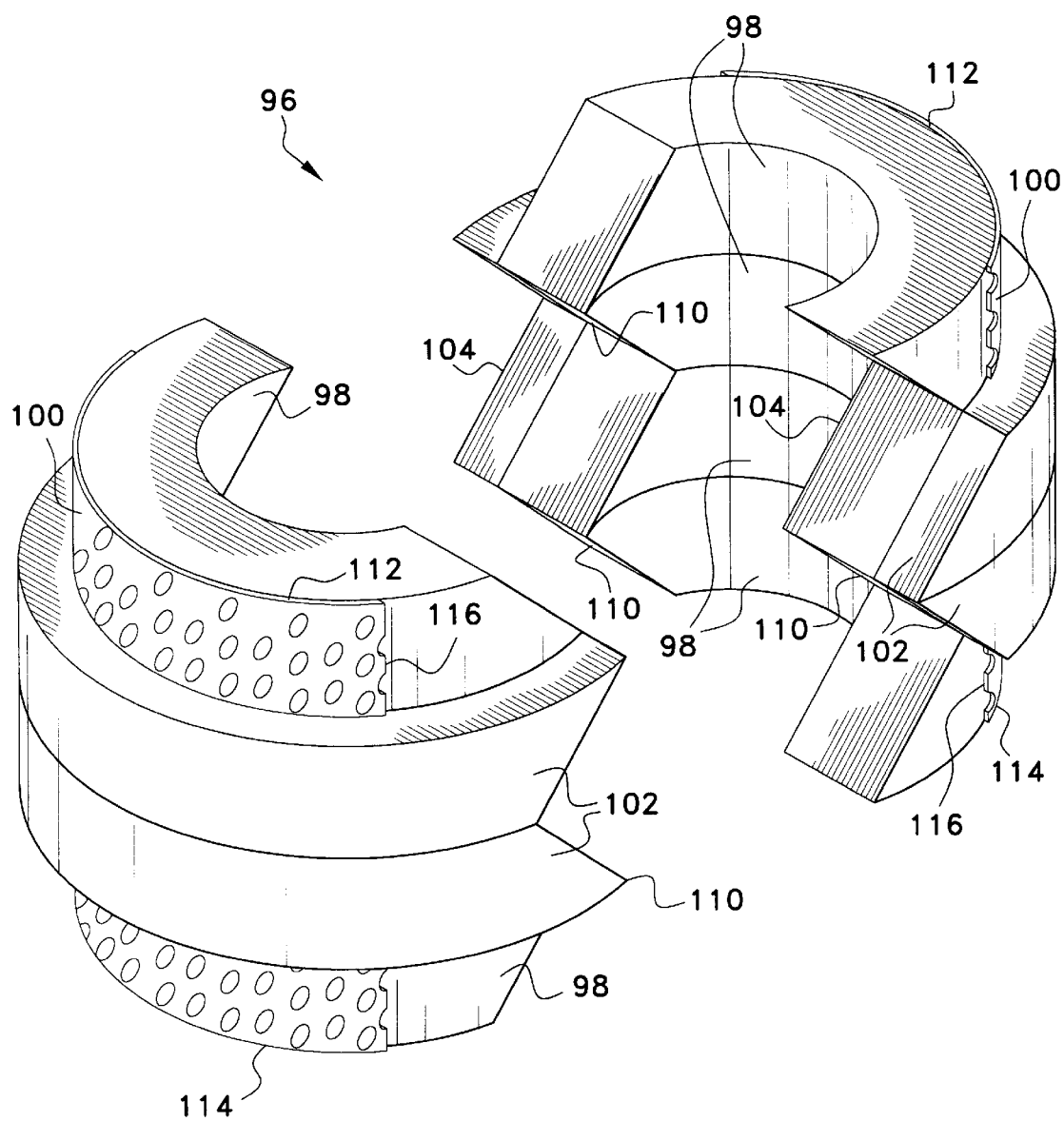
FIG. 6 is an exploded perspective view of the first embodiment of the packing material of the present invention.

Referring to FIG. 6, the packing system 10 further includes a preformed packing 96. The preformed packing 96 includes inner rings or bands 98 which are stacked vertically atop one another. The preformed packing 96 also includes a pair of perforated metal sheets 100 which cradle portions of the stack of inner rings 98. Wrapped around the assembly consisting of the stack of inner rings 98 and the perforated sheets 100, are two outer rings 102. The rings 98 and 102 can be made of graphite ribbon. The graphite ribbon is first wrapped around a dowel of appropriate diameter as many times as is necessary to obtain the desired thickness in the rings 98 and 102. The graphite ribbon around the dowel is then pressed in a die to obtain any of the rings 98 and 102 depending upon the diameter of the dowel and the dimensions of the die used. Once formed, the inner rings 98 are stacked one on top of another and the perforated metal sheets 100 are placed in contact with the stack of inner rings 98 such that the sheets 100 cradle the stack of inner rings 98 on opposite sides of the stack of inner rings. The perforated metal sheets 100 have a top edge 112, a bottom edge 114, and side edges 116. The side edges 116 are parallel to the longitudinal axis of the bore of the stack of inner rings 98. The top and bottom edges 112 and 114 follow an arc of a circle that is concentric with the inner rings 98 and just fits around the exterior of the stack of inner rings 98, such that the perforated metal sheets 100 conform to the exterior of the stack of inner rings 98. The perforated metal sheets 100 are placed on opposite sides of the stack of inner rings 98 with their concave sides partially wrapping around or cradling the stack of inner rings 98. With the perforated metal sheets positioned on opposite sides of the stack of inner rings 98, each side edge 116 of each perforated metal sheet 100 is an equal distance apart from the respective side edge 116 of the other perforated metal sheet 100. The outer rings 102 are then placed around the stack of inner rings 98 having the perforated sheets 100 around it. The entire assembly including the stack of inner rings 98, the perforated metal sheets 100, and the outer rings 102 is then pressed in a die to assume the final shape and dimensions of the preformed packing 96. Zigzag cuts 104 are then made in the sides of the preformed packing not overlapped by the perforated metal sheets 100. The zigzag cuts are made along the entire length of the preformed packing and through the entire thickness of the preformed packing such that in its final form the preformed packing 96 is split into two complementary halves as shown in FIG. 6. As an alternative, the graphite ribbon may be replaced by graphite impregnated cotton cord which is employed in the same manner as the graphite ribbon.

Figure 7:
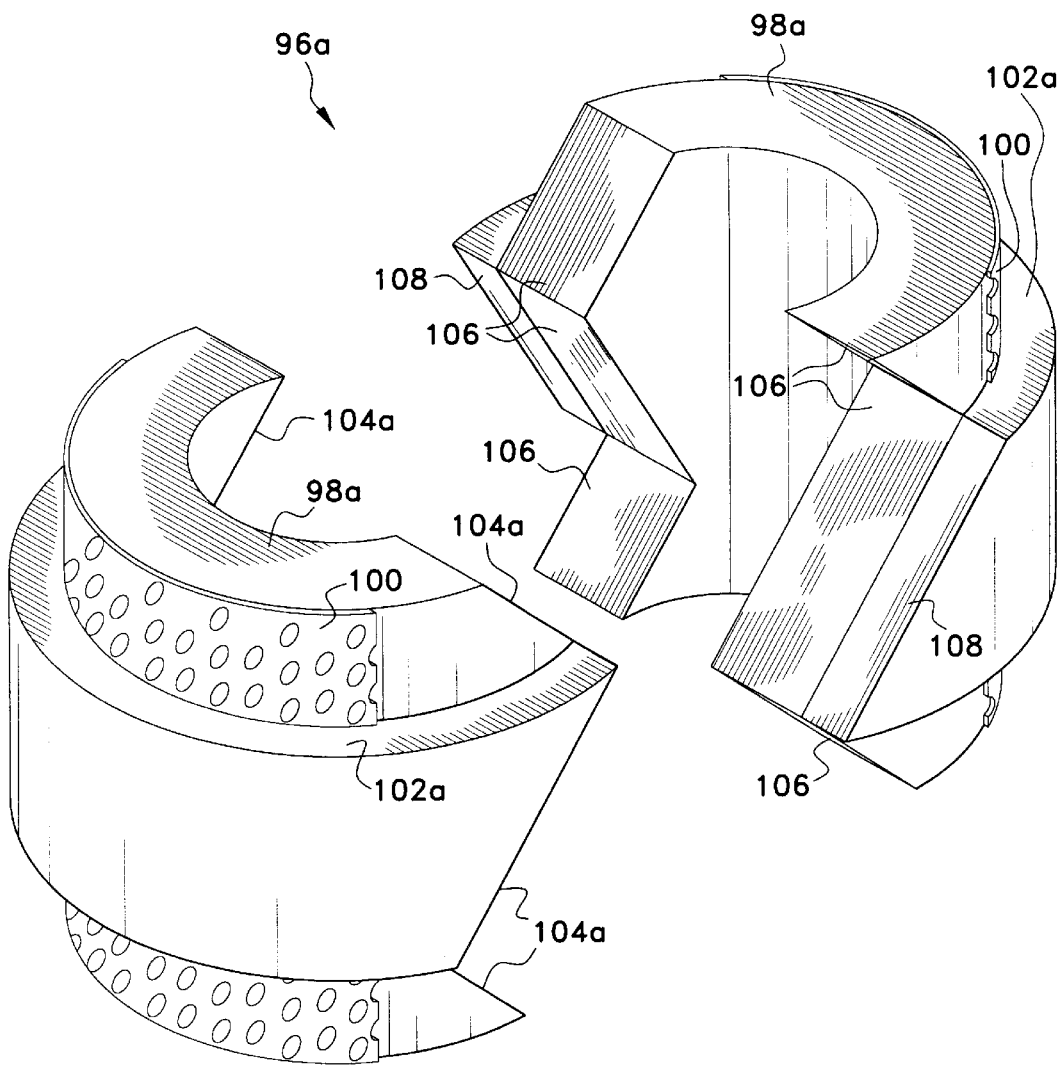
FIG. 7 is an exploded perspective view of the second embodiment of the packing material of the present invention.

As a further alternative, the stack of inner rings 98 may be replaced with a cylindrical shell 98a made of die formed graphite or injection molded polytetrafluoroethylene (also known as TEFLON®) as shown in FIG. 7. Also, the outer rings 102 may be replaced by the outer cylindrical shell 102a, again, made of die formed graphite or injection molded TEFLON®. As before, the assembly including the cylindrical shell 98a, the perforated metal sheets 100, and the outer cylindrical shell 102a is pressed to final dimensions in a die and then cut into two complementary halves, with two zigzag cuts made in the portions not overlapped by the perforated metal sheets 100, to form the preformed packing 96a. As yet another alternative, each half of the cylindrical shells 98a and 102a can be separately formed, using either die formed graphite or injection molded TEFLON®, such that facets 106 and 108, identical to those formed by the zigzag cut 104a, are already formed in the cylindrical shells 98a and 102a. Each half of the cylindrical shell 98a, a respective perforated sheet 100, and a respective half of the outer cylindrical shell 102a are then assembled together in the configuration shown in FIG. 7 and are then pressed together in an appropriately shaped die to finally size the assembly to its desired dimensions. This process eliminates the zigzag cutting step. Still another alternative process for fabricating the preformed packing 96a would be to individually fabricate each complementary half of the preformed packing 96a, using either die formed graphite or injection molded TEFLON®, in a die or mold in which the respective perforated metal sheet 100 has previously been placed. Again, this alternative process obviates the need for the zigzag cutting step because the facets 106 and 108 are formed in the die forming or molding operation. In addition to the examples given above, any other suitable materials may also be employed for the fabrication of the preformed packing without departing from the spirit and scope of the present invention.

When the halves of either of the preformed packings 96 and 96a are assembled together, the preformed packings 96 and 96a will have a profile resembling a cylindrical tube having a projecting flange around its midsection. To illustrate the use of the preformed packings 96 and 96a, the application of the preformed packing 96 to packing the stuffing box of a valve will be discussed, but it should be borne in mind that the preformed packings 96 and 96a are interchangeable and the statements made below regarding the method of use of the preformed packing 96 are equally applicable to the preformed packing 96a.

Again referring to FIGS. 1–6, the packing system 10 includes a threaded bushing 38, an upper packing cup 60, a lower packing cup 80, and a preformed packing 96. The packing system 10 is intended for use with stuffing boxes that are threaded to receive a threaded bushing or a gland nut used to compress the valve packing. Also, the packing system 10 of the present invention can be retrofitted on existing valves that do not have a threaded stuffing box by tapping the stuffing-box with a fine thread tap.

To apply the packing system 10 to a valve such as valve 14, the valve is first disassembled and all the contents of the stuffing box including the gland nut and any packing are removed. The lower packing cup 80 is then slipped around the valve stem 12 such that the opening 90 faces toward the hand wheel 32. Next, the upper packing cup 60 is placed around the valve stem 12 such that the opening 74 faces the opening 90. The valve 14 is then reassembled in the usual manner. The lower packing cup 80 is allowed to slide to the bottom of the stuffing box 20, while the upper packing cup 60 is held above the threaded opening of the stuffing box 20. At this point, the halves of the preformed packing 96 are brought together around the valve stem 12 and between the upper packing cup 60 and the lower packing cup 80. The two halves of the preformed packing 96 are brought together such that the surfaces formed by the zigzag cut 104 on each side of each half of the preformed packing 96 matingly interlock with the complementary surfaces of the other half of the preformed packing 96. At this stage, the stack of inner rings 98 and the perforated metal sheets 100 define a roughly cylindrical jacket around the valve stem 12, with the outer rings 102 forming a band around the middle of the cylindrical jacket formed by the stack of inner rings 98 and the perforated metal sheets 100. The stack of inner rings 98 define a central bore, in the preformed packing 96, which is dimensioned to allow the preformed packing 96 to fit around the valve stem 12 when the two halves of the preformed packing 96 are brought together. The portions of the preformed packing 96, extending from either side of the outer rings 102, have a diameter that allows these portions to pass freely through the openings 74 and 90. The preformed packing 96 is now lowered relative to the stuffing box 20 until the end, facing the lower packing cup 80, of the stack of inner rings 98 contacts the bottom 82 of the lower packing cup 80. Next, the halves of the threaded bushing 38 are assembled around the valve stem 12 with the upper packing cup 60 positioned such that the flange 70 is fully enclosed within the groove 58. The passage 54 is dimensioned to allow the threaded bushing 38 to fit around the valve stem 12 when the two halves of the threaded bushing 38 are brought together, around the valve stem 12, such that the cross sectional surface 50 of each half of the threaded bushing 38 abuttingly contact one another. With the two halves of the threaded bushing 38 held together, the assembly including the threaded bushing 38 and the upper packing cup 60 is lowered until the male external threads 40 of the threaded bushing 38 engage the female internal threads 36 of the stuffing box 20.

With the threads 40 engaging the threads 36, turning the threaded bushing 38 further lowers the threaded bushing 38 into the stuffing box 20. As the threaded bushing 38 is turned further, the upper packing cup 60 will contact the end of the stack of inner rings 98 distal from the lower packing cup 80. Further tightening or turning of the threaded bushing 38 will cause the preformed packing 96 to be crushed between the upper packing cup 60 and the lower packing cup 80. As the preformed packing 96 is crushed, the portions of the stack of inner rings 98 within each of the upper and lower packing cups 60 and 80 is deformed and is molded into the upper packing cup 60 and into the lower packing cup 80, respectively, until the concavities formed by the upper packing cup 60 and valve stem 12 and by the lower packing cup 80 and the valve stem 12 are completely filled with packing material. As the turning of the threaded bushing 38 continues, the material of the stack of inner rings 98 is compressed against the valve stem 12. Further tightening of the threaded bushing 38 brings the surfaces 79 and 94 into contact with the outer rings 102. Continued tightening of the threaded bushing 38 will cause the outer rings 102 to be crushed between the upper and lower packing cups 60 and 80 and will cause the material of the outer rings 102 to be compressed against the wall of the stuffing box 20. Also, during this compression process any spaces in the perforations of the perforated metal sheets 100, that were not filled during the fabrication of the preformed packing 96, are filled with the material of the inner rings 98 and the outer rings 102. Thus any potential leakage paths along the wall of the stuffing box 20 and the surface of the valve stem 12 are sealed by the material of the stack of inner rings 98 and the material of the outer rings 102. Also, note that as the material of inner rings 98 is molded into the concavities formed by the upper packing cup 60 and valve stem 12 and by the lower packing cup 80 and the valve stem 12, the portions of the perforated metal sheets 100 within the upper and lower packing cups 60 and 80 are bent to roughly assume the contour of the surfaces 78 and 92. The threaded bushing 38 is now fully tightened and the valve 14 can be operated in the normal manner.

The advantage of splitting the preformed packing 96 with a zigzag or chevron cut 104 now becomes apparent. As the preformed packing 96 is crushed each wedge 110 formed by the cut 104 in one of the halves of the preformed packing 96 is compressively forced against an adjacent wedge 110 in the other half of the preformed packing 96 thus providing positive sealing of the interface between the two halves of the preformed packing 96. Had the cut splitting the preformed packing 96 into two complementary halves been a straight longitudinal cut, then the compression of the preformed packing 96 could have created gaps at the interface between the halves of the preformed packing 96 which could have resulted in a leakage path through the preformed packing 96.

As the preformed packing 96 wears, the threaded bushing 38 can be tightened further to bring more packing material into compressive contact with the wall of the stuffing box 20 and with the surface of the valve stem 12 to thereby reestablish the seal between those surfaces and the material of the preformed packing 96.

To replace the preformed packing 96 entirely when the preformed packing becomes too worn, the threaded bushing 38 is unscrewed from the stuffing box 20 simultaneously lifting the upper packing cup 60 out of the stuffing box 20. Because the bent portions of the perforated metal sheets 100 hold the upper packing cup 60, the preformed packing 96, and the lower packing cup 80 together, the preformed packing 96 and the lower packing cup 80 will also be lifted out of the stuffing box 20. This feature eliminates the need for packing picks and pullers for pulling the packing material from the stuffing box 20. Another function of the perforated metal sheets 100 is to provide structural support for the preformed packing 96 so that the preformed packing does not fall apart during handling both before and after the installation of the preformed packing 96 in the stuffing box 20. During the die formation or molding step of the fabrication process of the preformed packing 96, the material of the inner rings 98 and the material of the outer rings 102 flow into the perforations in the perforated metal sheets 100 to thereby mechanically adhere the inner rings 98 and the outer rings 102 to the perforated metal sheets 100. Thus the perforated metal sheets 100 act as a mechanical binding agent for the components of the preformed packing 96.

After the threaded bushing 38 is unscrewed from the stuffing box 20, the upper packing cup 60, the preformed packing 96, and the lower packing cup 80 must be lifted clear out of the stuffing box 20. If there is not enough clearance between the top of the valve bonnet 30 and the stuffing box 20, the split design of the threaded bushing 38 allows the threaded bushing 38 to be removed from around the valve stem 12 without disassembling the valve 14, thereby leaving enough room for the assembly including the upper packing cup 60, the preformed packing 96, and the lower packing cup 80 to be lifted clear from the stuffing box 2 0. The upper packing cup 60 and the lower packing cup 80 are then pulled apart from one another until at least one end of the preformed packing 96 is released from either the upper packing cup or the lower packing cup. The halves of the preformed packing 96 can now be pulled apart to remove the preformed packing 96 from around the valve stem 12 without disassembling the valve 14. A new preformed packing 96 can now be assembled around the valve stem 12 and the steps for initially packing the stuffing box 20, as was described previously, can be repeated to repack the stuffing box 20 and thus complete the preformed packing replacement procedure. If desired, pipe dope or pipe thread sealant can be applied to the male threads 40 on the threaded bushing 38 to provide an extra measure of security against leakage between the wall of the stuffing box 20 and the preformed packing 96.

When replacing the preformed packing 96, the upper packing cup 60 and the lower packing cup 80 need not be removed from the valve 14, therefore the upper packing cup 60 and the lower packing cup 80 nee d not be split into two complementary halves. However, i f desired, the upper packing cup 60 and the lower packing cup 80 can be made in a split configuration with out interfering with the proper functioning of the packing system 10. Making the upper packing cup 60 and the lower packing cup 80 in a split configuration would have the added advantage that the packing system 10 can be retrofitted to an existing valve without having to disassemble the valve. On the other hand, none of the components of the packing system 10 need to have a split configuration if the inconvenience of disassembling the valve 14, each time the preformed packing 96 has to be replaced, is not of concern given the maintenance requirements of the particular situation.

Although in the embodiment illustrated in FIGS. 1–6 the ends of the stack of inner rings 98 are flush with the top and bottom edges of the perforated metal sheets 100, this particular configuration is not a general requirement and the ends of the stack of inner rings 98 may extend beyond the top and bottom edges of the perforated metal sheets 100. A similar statement holds true for the embodiment illustrated in FIG. 7.

The threaded bushing 38, the upper packing cup 60, the perforated metal sheets 100, and the lower packing cup 80 are preferably made of corrosion-resistant material. One of the preferred materials for the perforated metal sheets 100 is 302 stainless steel, while 416 stainless steel is preferred for the construction of the threaded bushing 38, the upper packing cup 60, and the lower packing cup 80.

The packing system of the present invention can be manufactured to fit different stem and stuffing-box diameters. The hex head 52 affords single wrench even torquing of the threaded bushing 38. The threaded bushing 38 allows smooth incremental adjustment of the compressive force applied to the preformed packing 96 or 96*a*.

The packing system of the present invention allows automatic even distribution of the pressure required to seal around the valve stem. Thus the present invention reduces the labor required for repacking valves, and minimizes the exposure of workers to the process fluid. This is especially important when the process fluid is hazardous, at high temperature and/or radioactive. The packing system of the present invention requires no special tools, being installable using merely a single wrench, thus obviating the need for packing picks, pullers, mirrors, or flashlights.

Because the present invention allows effective sealing to be maintained, around the valve stem and through the stuffing box, by merely tightening the threaded bushing 38 as the preformed packing wears, the packing system of the present invention will allow the same packing material to provide satisfactory sealing for a prolonged period of time, thus allowing the present invention to outlast conventional packing for years.

Figure 9:
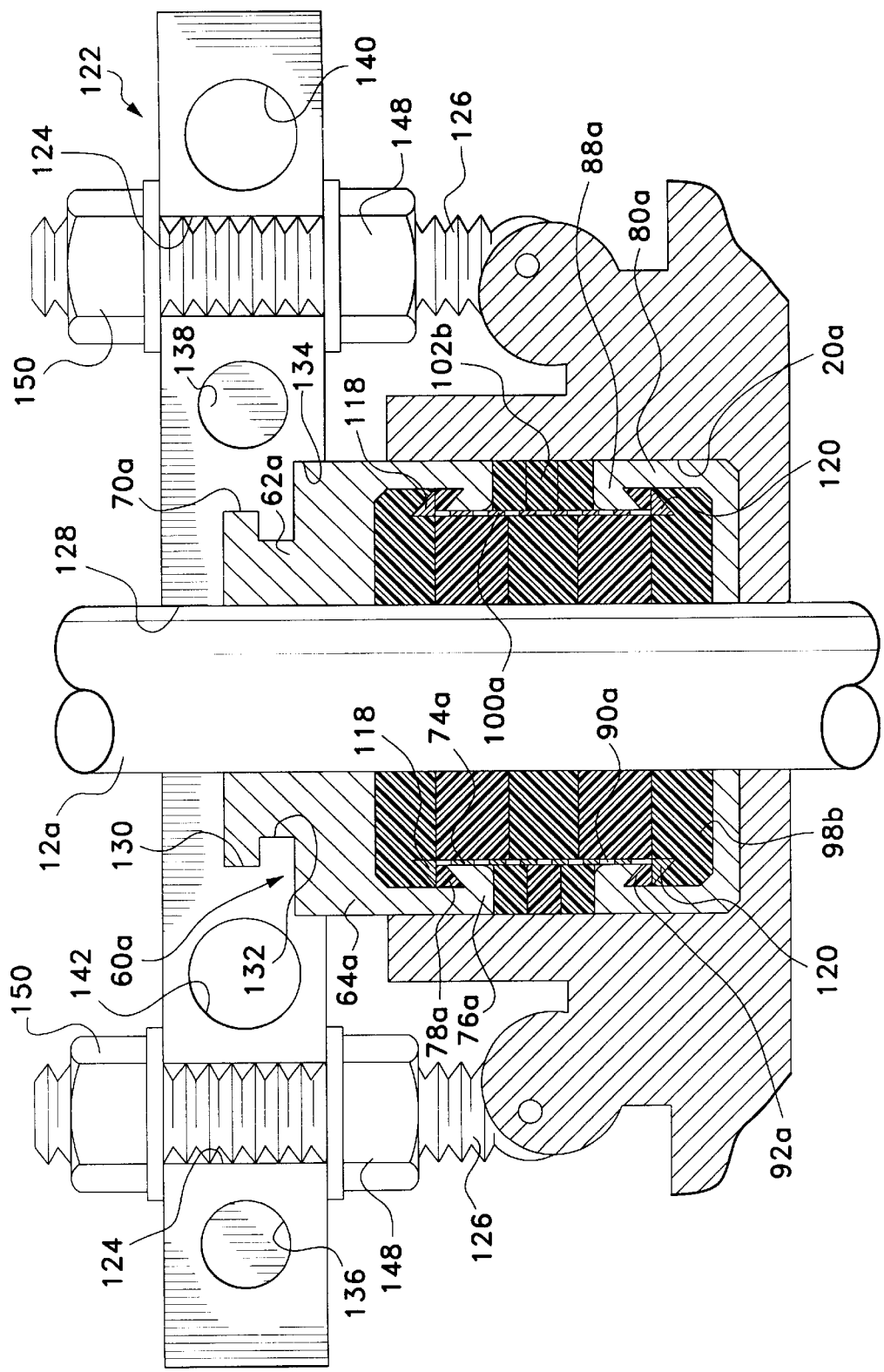
FIG. 9 is a fragmentary, enlarged cross sectional view showing the third embodiment of the gland packing material of the present invention used in conjunction with a split yoke for compressing the packing material in a non-threaded stuffing box.
Figure 10:
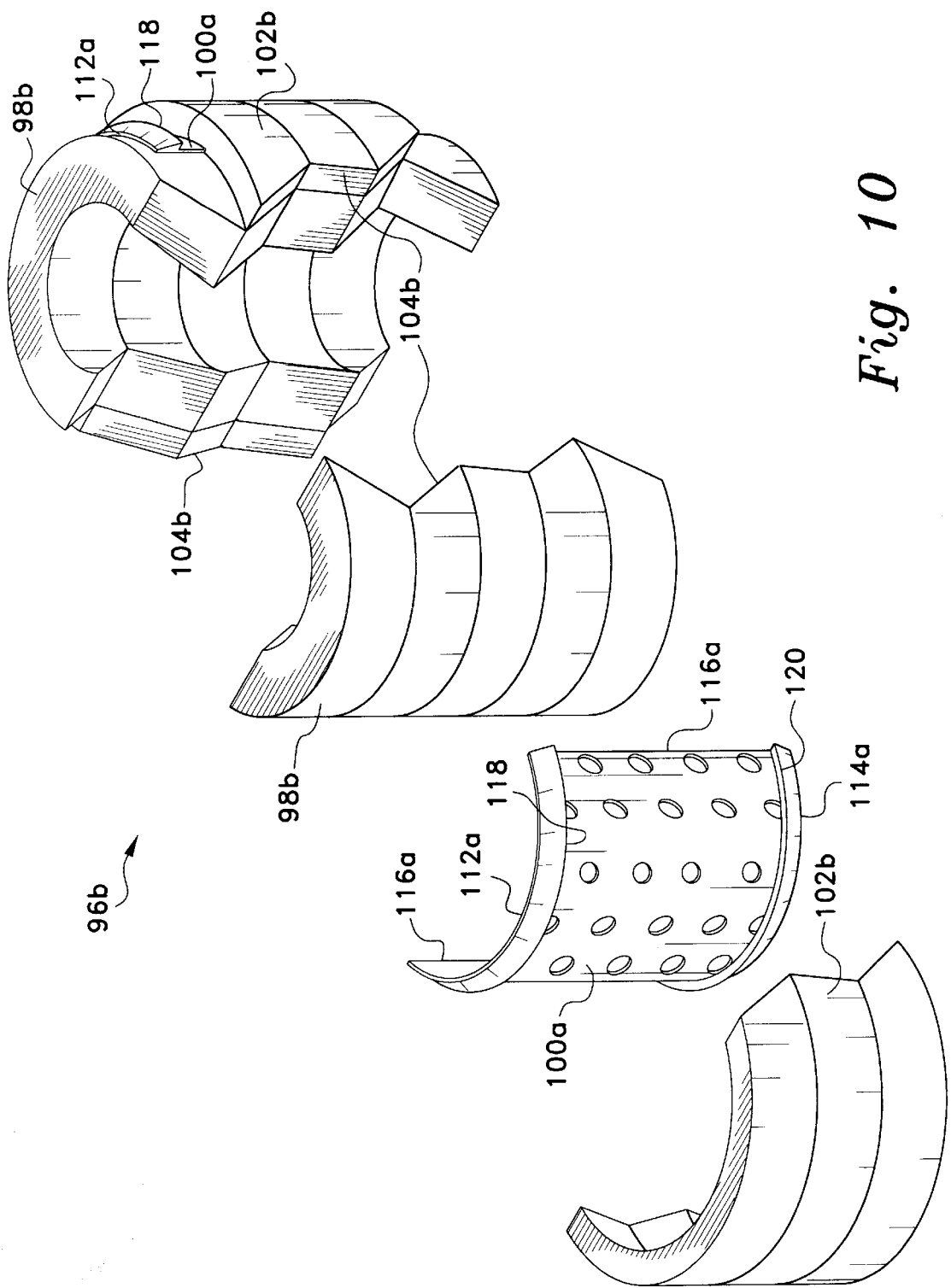
FIG. 10 is an exploded perspective view of the third embodiment of the packing material of the present invention.

Referring to FIGS. 9 and 10, a third embodiment of the preformed packing 96*b* can be seen. Preformed packing 96*b* includes an inner cylindrical shell 98b, a pair of perforated metal sheets 100a, and an outer cylindrical shell 102b. The preformed packing 96b can be made of the same materials and using the same fabrication techniques as those used for the fabrication of the preformed packings 96 and 96a. The cylindrical shell 98b may be of unitary construction or it may be formed by a stack of rings pressed together. Similarly, the cylindrical shell 102b may be of unitary construction or it may be formed by a stack of rings pressed together.

The perforated metal sheets 100a are very similar to perforated metal sheets 100, however there are differences between the two and these differences will become apparent as the perforated metal sheets 100a are described in greater detail below. The perforated metal sheets 100a have a top edge 112a, a bottom edge 114a, and side edges 116a. The side edges 116a are parallel to the longitudinal axis of the bore of the inner cylindrical shell 98b. The top and bottom edges 112a and 114a follow an arc of a circle that is concentric with the inner cylindrical shell 98b and just fits around the exterior of the inner cylindrical shell 98b, such that the perforated metal sheets 100a conform to the exterior of the inner cylindrical shell 98b. The perforated metal sheets 100a are placed on opposite sides of the inner cylindrical shell 98b with their concave sides partially wrapping around or cradling the inner cylindrical shell 98b. With the perforated metal sheets positioned on opposite sides of the inner cylindrical shell 98b, each side edge 116a of each perforated metal sheet 100a is an equal distance apart from the respective side edge 116a of the other perforated metal sheet 100a. The outer cylindrical shell 102b is then placed around the midsection of the assembly including the inner cylindrical shell 98b and the perforated metal sheets 100a and the entire assembly is pressed to final size in a sizing die. Zigzag or chevron cuts 104b are made that completely traverse the thickness of the inner and outer cylindrical shells 98b and 102b and split the preformed packing 96b into two complementary halves. The cuts 104b are made in the gaps between the edges 116a of the opposing perforated metal sheets 100a on either side of the preformed packing 96b.

The top and bottom edges of each perforated metal sheet 100a are provided with flanges 118 and 120, respectively. The flange 118 is sawtooth or right triangular in cross section, such that the amount of projection of the flange 118 from the convex side of the perforated portion of the sheets 100a tapers from a maximum at the ridge of the flange 118, located distally from the edge 112a, to a minimum at the edge 112a. Similarly, each flange 120 is sawtooth or right triangular in cross section, such that the amount of projection of the flange 120 from the convex side of the perforated portion of the sheets 100a tapers from a maximum at the ridge of the flange 120, located distally from the edge 114a, to a minimum at the edge 114a.

The preformed packing 96b may be used in conjunction with specially designed upper and lower packing cups 60a and 80a. The packing cups 60a and 80a are essentially identical to packing cups 60 and 80 except for the differences noted below. In the upper packing cup 60a the flange 76 is replaced with a flange 76a which has a surface 78a beveled at a reentrant angle such that the flange 76a is thinner at its base than at the opening 74a. Similarly, in the lower packing cup 80a the flange 88 is replaced with a flange 88a which has a surface 92a beveled at a reentrant angle such that the flange 88a is thinner at its base than at the opening 90a. Otherwise the packing cups 60a and 80a are essentially identical to the packing cups 60 and 80.

With the preformed packing 96b crushed between the upper and lower packing cups 60a and 80a, the flanges 118 and 120 snap over and catch the flanges 76a and 88a, respectively. In addition, with the preformed packing 96b crushed between the upper and lower packing cups 60a and 80a, the inner cylindrical shell is molded into the concavities cooperatively formed by the valve stem 12a and the packing cups 60a and 80a, the material of the inner cylindrical shell 98b is pressed against the valve stem 12a thus eliminating leakage paths along the surface of the valve stem 12a, and the material of the outer cylindrical shell 102b is pressed against the wall of the stuffing box 20a thus eliminating leakage paths along the wall of the stuffing box 20a. During replacement of the preformed packing 96b the flanges 118 and 120 act to allow removal of the upper packing cup, the preformed packing, and the lower packing cup as a unit from the stuffing box 20a. Thus, the flanges 118 and 120 perform the same function as the bent portions of the perforated metal sheets 100. In preformed packing 96b, it is important for the inner cylindrical shell 98b to extend beyond the edges 112a and 114a so that the material of the inner cylindrical shell 98b can flow around the flanges 118 and 120 and completely fill the concavities cooperatively formed by the valve stem 12a and the packing cups 60a and 80a.

The upper packing cup 60a, the preformed packing 96b, and the lower packing cup 80a can be used with the threaded bushing 38 to pack the threaded stuffing box 20, however, in the example illustrated in FIG. 9, the upper packing cup 60a, the preformed packing 96b, and the lower packing cup 80a are shown packing a non-threaded stuffing box 20a of a type of valve that uses a gland yoke to press fit packing material into its stuffing box 20a. FIG. 9 also illustrates a specially designed gland yoke 122 that can engage the flange 70a of the upper packing cup 60a and be used to apply compressive force to the preformed packing 96b located at least in part within the stuffing box 20a.

The gland yoke 122 has two passages 124 which allow the threaded bolts 126 to pass through the gland yoke 122. The bolts 126 are attached, at one end thereof, to the valve housing at either side of the stuffing box 20a. The gland yoke 122 also has a central passage 128 to allow the valve stem 12a to pass through the gland yoke unencumbered. Following the passage 128, in a direction toward the stuffing box 20a, it is observed that the passage 128 widens into the annular groove 130 which then narrows into the flange 132 which then widens into the counterbored recess 134. The groove 130 is sized to receive the flange 70a. The flange 132 is dimensioned to fit around the small diameter portion 62a while being too small to allow the flange 70a to slide out of groove 130. The diameter of the counterbored recess 134 is such that the external diameter of the large diameter portion 64a can be accommodated within the counterbored recess 134.

Figure 8:
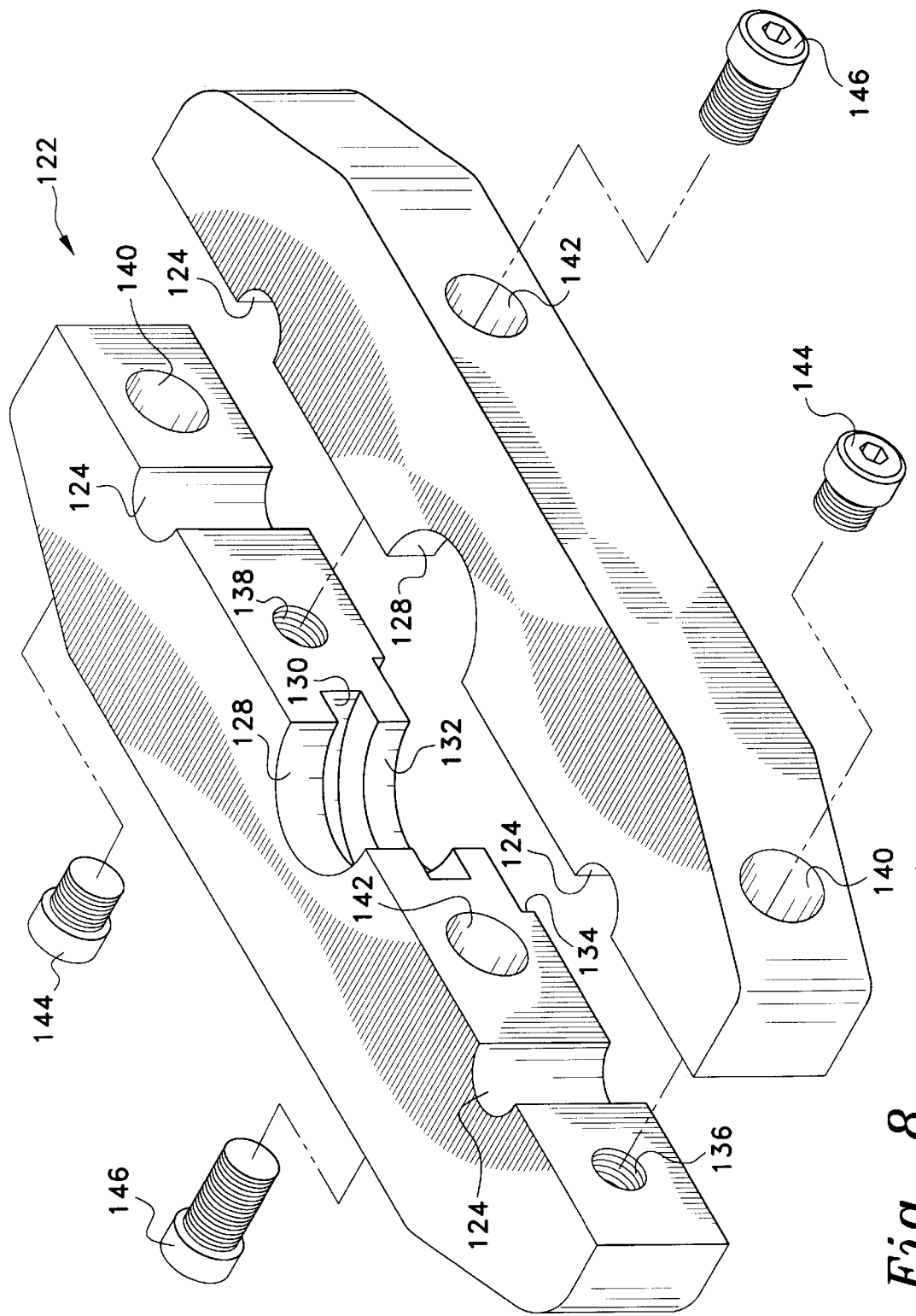
FIG. 8 is an exploded perspective view of a split yoke used to compress gland packing material in an alternative type of valve.

Referring to FIG. 8, the gland yoke 122 is split into two identical halves. Each half has two threaded holes 136 and 138 and two through holes 140 and 142. A pair of short screws 144 pass through the holes 140 and engage the threaded holes 136. A pair of longer screws 146 pass through the holes 142 and engage the threaded holes 138. The holes 140 and 142 are counterbored for the heads of the screws 144 and 146. Thus, the screws 144 and 146 are used to clamp the halves of the gland yoke 122 together. With the gland yoke 122 clamped around the upper packing cup 60a and the bolts 126 as shown in FIG. 9, the gland yoke 122 can be used to apply a compressive force to the preformed packing 96b to thereby cause the preformed packing to create a seal against the wall of the stuffing box 20a and against the valve stem 12a. To apply this compressive force, the lock nuts 148 are turned such that they move away from the gland yoke 122 and no longer impede movement of the gland yoke 122 toward the stuffing box 20a. The nuts 150 can now be turned to drive the upper packing cup 60a into the stuffing box 20a to thereby compress the preformed packing 96b. This process is continued until packing material fills all the spaces between and within the upper packing cup 60a and the lower packing cup 80a, and the preformed packing has created a seal against the wall of the stuffing box 20a and against the valve stem 12a. The lock nuts 148 can now be tightened up against the gland yoke 122 to keep the nuts 150 from working loose and thus to keep the gland yoke 122 in place.

Although the use of the gland yoke 122 has been illustrated in conjunction with the upper packing cup 60a, the preformed packing 96b, and the lower packing cup 80a; the upper packing cup 60, the preformed packings 96 and 96a, and the lower packing cup 80 can also be used in conjunction with the gland yoke 122 to pack a north-threaded stuffing box 20a.

Figure 11:
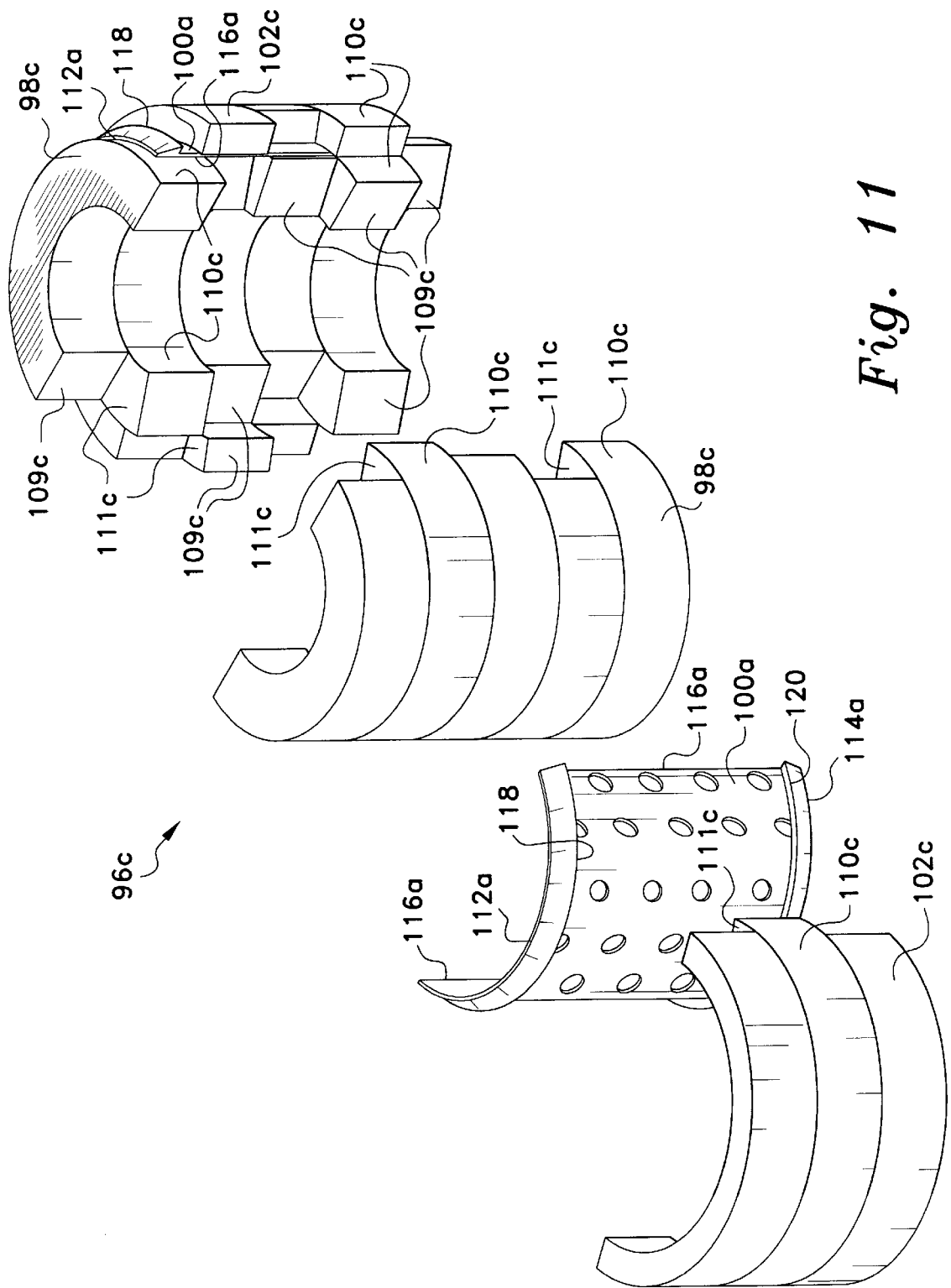
FIG. 11 is an exploded perspective view of yet another embodiment of the packing material of the present invention.
Figure 12:
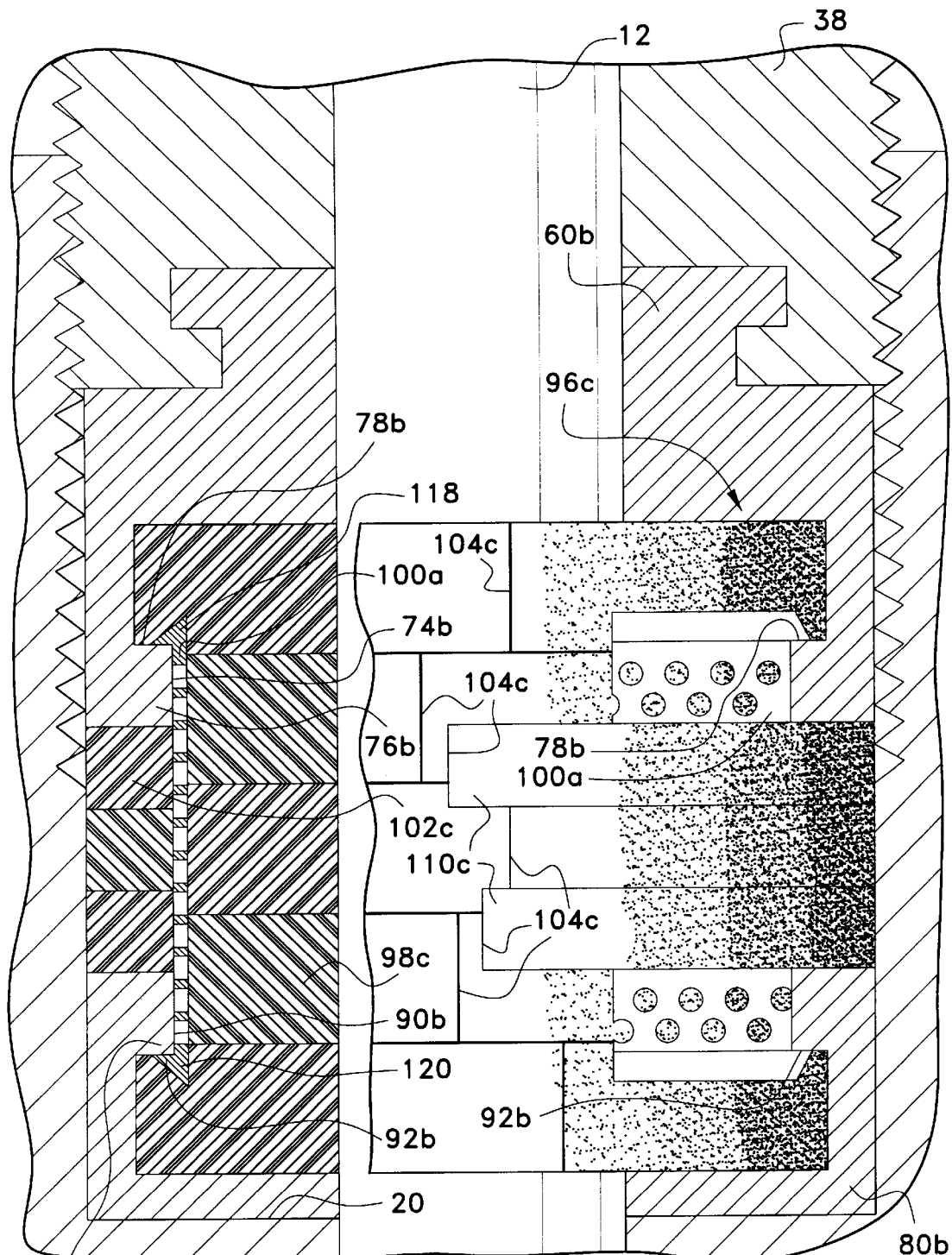
FIG. 12 is a fragmentary, enlarged cross sectional view showing an embodiment of the gland packing material of the present invention wherein the packing is split using staggered vertical cuts.

Referring to FIGS. 11 and 12, yet another embodiment of the preformed packing 96c can be seen. Preformed packing 96c includes an inner cylindrical shell 98c, a pair of perforated metal sheets 100a, and an outer cylindrical shell 102c. The preformed packing 96c can be made of the same materials and using the same fabrication techniques as those used for the fabrication of the preformed packings 96, 96a, and 96b. The preformed packing 96c differs from the preformed packing 96b only in that the preformed packing 96c is split by a series of staggered vertical cuts 104c made in each of the packing rings constituting the inner and outer cylindrical shells 98c and 102c instead of the zigzag cut 104b. If the inner and outer cylindrical shells 98c and 102c were of unitary construction, then horizontal cuts extending between the vertical cuts would also have to be made to completely split the preformed packing 96c. The cuts 104c, and the horizontal cuts extending between them when required, form surfaces which are constituted by axial facets 109c and transverse facets 111c. The surfaces formed by the axial facets 109c and the transverse facets 111c are the surfaces over which the halves of the preformed packing 96c contact one another when the two halves are assembled together.

The surfaces formed in the inner and outer cylindrical shells 98c and 102c by the staggered vertical cuts have a profile in the shape of alternating essentially rectangular peaks and valleys. When the two halves of the preformed packing 96c are assembled together, the rectangular peaks in one half fit into complementary rectangular valleys in the other half of the preformed packing 96c. As the preformed packing 96c is crushed each rectangular peak 110c formed by the cuts 104c in one of the halves of the preformed packing 96c is compressed between adjacent rectangular peaks 110c in the other half of the preformed packing 96c thus providing positive sealing of the interface between the two halves of the preformed packing 96c. As with the zigzag cut, the staggered vertical or axial cuts avoid the problem of gaps, created by the compression of the preformed packing, at the interface between the halves of the preformed packing 96c.

As with preformed packing 96b, the perforated metal sheets 100a are placed on opposite sides of the inner cylindrical shell 98c with their concave sides partially wrapping around or cradling the inner cylindrical shell 98c. The outer cylindrical shell 102c fits around the midsection of the assembly including the inner cylindrical shell 98c and the perforated metal sheets 100a. Staggered cuts 104c split the preformed packing 96c into two complementary halves. The cuts 104c are formed in the gaps between the edges 116a of the opposing perforated metal sheets 100a on either side of the preformed packing 96c.

In FIG. 12, the preformed packing 96c is shown while being used in conjunction with upper and lower packing cups 60b and 80b. The packing cups 60b and 80b are essentially identical to packing cups 60a and 80a except for the differences noted below. In the upper packing cup 60b the flange 76a is replaced with a flange 76b having a flat surface 78b which is perpendicular to the wall of the opening 74b. Similarly, in the lower packing cup 80b the flange 88a is replaced with a flange 88b having a flat surface 92b which is perpendicular to the wall of the opening 90b. Otherwise the packing cups 60b and 80b are essentially identical to the packing cups 60a and 80a.

With the preformed packing 96c crushed between the upper and lower packing cups 60b and 80b, the flanges 118 and 120 snap over and catch the flanges 76b and 88b, respectively. In addition, with the preformed packing 96c crushed between the upper and lower packing cups 60b and 80b, the inner cylindrical shell is molded into the concavities cooperatively formed by the valve stem 12 and the packing cups 60b and 80b. In addition, the material of the inner cylindrical shell 98c is pressed against the valve stem 12 thus eliminating leakage paths along the surface of the valve stem 12, and the material of the outer cylindrical shell 102c is pressed against the wall of the stuffing box 20 thus eliminating leakage paths along the wall of the stuffing box 20.

In FIG. 12, the upper packing cup 60b, the preformed packing 96c, and the lower packing cup 80b are seen in use with the threaded bushing 38 to pack the threaded stuffing box 20, however, the upper packing cup 60b, the preformed packing 96c, and the lower packing cup 80b can also be used with the gland yoke 122 to pack a non-threaded stuffing box 20a.

It is to be understood that the present invention is not limited to the embodiments described above, but encompasses any and all embodiments within the scope of the following claims.

We claim:

1. A preformed packing comprising:
   an inner cylindrical shell;
   a pair of perforated metal sheets cradling said inner cylindrical shell; and
   an outer cylindrical shell surrounding said inner cylindrical shell and said pair of perforated metal sheets, wherein said outer cylindrical shell is shorter in length than said inner cylindrical shell.

2. The preformed packing according to claim 1, wherein said inner cylindrical shell has a first thickness and said outer cylindrical shell has a second thickness, and wherein the preformed packing is split into two halves by a pair of zigzag cuts traversing said second thickness of said outer cylindrical shell and said first thickness of said inner cylindrical shell on opposite sides of the preformed packing, said pair of zigzag cuts being formed in portions of the preformed packing not overlapped by said pair of perforated metal sheets.

3. The preformed packing according to claim 1, wherein said outer cylindrical shell, said inner cylindrical shell, and said pair of perforated metal sheets are press fit together such that they are bound together.

4. The preformed packing according to claim 3, wherein said inner cylindrical shell has a first thickness and said outer cylindrical shell has a second thickness, and wherein the preformed packing is split into two halves by a pair of zigzag cuts traversing said second thickness of said outer cylindrical shell and said first thickness of said inner cylindrical shell on opposite sides of the preformed packing, said pair of zigzag cuts being formed in portions of the preformed packing not overlapped by said pair of perforated metal sheets.

5. A preformed packing comprising:

an inner shell in the form of a portion of a first cylindrical shell;

a perforated metal sheet cradling a portion of a convex side of said inner shell; and an outer shell in the form of a portion of a second cylindrical shell, said outer shell being mated to said perforated metal sheet and said inner shell such that a portion of said perforated metal sheet is sandwiched between said inner shell and said outer shell, and wherein said outer shell, said inner shell, and said perforated metal sheet are bound together such that they form an integral unit;

wherein said first cylindrical shell has a first thickness, said inner shell is equal in thickness to said first cylindrical shell, said portion of said first cylindrical shell being formed by a first plurality of zigzag facets intersecting said first cylindrical shell at a first location and by a second plurality of zigzag facets intersecting said first cylindrical shell at a side of said first cylindrical shell about opposite said first location, said first plurality of zigzag facets and said second plurality of zigzag facets extending entirely through said first thickness of said first cylindrical shell, and wherein said second cylindrical shell has a second thickness, said outer shell is equal in thickness to said second cylindrical shell, said portion of said second cylindrical shell being formed by at least a third facet intersecting said second cylindrical shell at a second location and by at least a fourth facet intersecting said second cylindrical shell at a side of said second cylindrical shell about opposite said second location, said third facet and said fourth facet extending entirely through said second thickness of said second cylindrical shell, said third facet being co-planar with a selected one of said first plurality of zigzag facets, and said fourth facet being co-planar with a selected one of said second plurality of zigzag facets.

6. The preformed packing according to claim 5, wherein said outer shell, said inner shell, and said perforated metal sheet are press fit together in a die such that they are bound together.

7. The preformed packing according to claim 5, wherein said outer shell and said inner shell are integrally molded around said perforated metal sheet.

8. The preformed packing according to claim 5, wherein said outer shell and said inner shell are integrally die formed around said perforated metal sheet.

9. The preformed packing according to claim 5, wherein said first plurality of zigzag facets and said second plurality of zigzag facets are complementary, and said third facet and said fourth facet are also complementary, such that the preformed packing can matingly engage a duplicate of itself to thereby form a packing suitable for placement in a stuffing box.

10. A preformed packing comprising:

an inner shell in the form of a portion of a first cylindrical shell;

a perforated metal sheet cradling a portion of a convex side of said inner shell; and an outer shell in the form of a portion of a second cylindrical shell, said outer shell being mated to said perforated metal sheet and said inner shell such that a portion of said perforated metal sheet is sandwiched between said inner shell and said outer shell, and wherein said outer shell, said inner shell, and said perforated metal sheet are bound together such that they form an integral unit;

wherein said first cylindrical shell has a first thickness, a first inner surface, and a first outer surface, said inner shell is equal in thickness to said first cylindrical shell, said portion of said first cylindrical shell being formed by a first surface intersecting said first cylindrical shell at a first location and by a second surface intersecting said first cylindrical shell at a side of said first cylindrical shell about opposite said first location, said first surface extending between said first inner surface and said first outer surface and being formed by a first plurality of staggered axial facets and at least one first transverse facet interconnecting an adjacent pair of said first plurality of staggered axial facets, said second surface extending between said first inner surface and said first outer surface and being formed by a second plurality of staggered axial facets and at least one second transverse facet interconnecting an adjacent pair of said second plurality of staggered axial facets, and wherein said second cylindrical shell has a second thickness, a second inner surface, and a second outer surface, said outer shell is equal in thickness to said second cylindrical shell, said portion of said second cylindrical shell being formed by a third surface intersecting said second cylindrical shell at a first side of said second cylindrical shell and by a fourth surface intersecting said second cylindrical shell at a second side of said second cylindrical shell about opposite said first side of said second cylindrical shell, said third surface extending between said second inner surface and said second outer surface and being formed by a third plurality of staggered axial facets and at least one third transverse facet interconnecting an adjacent pair of said third plurality of staggered axial facets, said fourth surface extending between said second inner surface and said second outer surface and being formed by a fourth plurality of staggered axial facets and at least one fourth transverse facet interconnecting an adjacent pair of said fourth plurality of staggered axial facets.

11. A packing system for packing a valve having a stuffing box, the stuffing box having a top opening, the packing system comprising:

a preformed packing having an inner cylindrical shell, a pair of perforated metal sheets cradling said inner cylindrical shell, and an outer cylindrical shell surrounding said inner cylindrical shell and said pair of perforated metal sheets;

an upper packing cup having a top flange and a first concavity facing in a direction opposite said top flange, said first concavity being configured to receive a top portion of said preformed packing, said upper packing cup further having a first retaining flange; and a lower packing cup dimensioned and configured to be placed within said stuffing box, said lower packing cup having a second concavity for receiving a lower portion of said preformed packing, said lower packing cup further having a second retaining flange, whereby after said preformed packing is crushed between said upper packing cup and said lower packing cup in the stuffing box of a valve, end portions of said pair of perforated metal sheets are captured by said first retaining flange and by said second retaining flange such that said upper packing cup, said preformed packing, and said lower packing cup can be lifted out of the stuffing box as a unit.

12. The packing system according to claim 11, wherein said inner cylindrical shell is formed by pressing a stack of a first plurality of rings in a die, and said outer cylindrical shell is formed by pressing a stack of a second plurality of rings in a die.

13. The packing system according to claim 11, the packing system further comprising:

a threaded bushing having a hexagonal head and an externally threaded portion, said threaded bushing being split into two halves and having an internal groove configured to capture said top flange of said upper packing cup, half of said internal groove being formed in each of said two halves of said threaded bushing, said internal groove capturing said top flange of said upper packing cup when said two halves of said threaded bushing are brought together with said top flange of said upper packing cup being in registry with each half of said internal groove in each of said two halves of said threaded bushing, said externally threaded portion being engageable with a threaded portion of the stuffing box, whereby turning said threaded bushing will push said upper packing cup further into the stuffing box when said externally threaded portion is engaged to the threaded portion of the stuffing box.

14. The packing system according to claim 13, wherein said first retaining flange has a first beveled surface such that said first retaining flange is wider at its base than at its rim, said first retaining flange capturing upper end portions of said pair of perforated metal sheets when said inner cylindrical shell deforms said upper end portions of said pair of perforated metal sheets such that said upper end portions of said pair of perforated metal sheets conform to said first beveled surface as said inner cylindrical shell is crushed, and said second retaining flange has a second beveled surface such that said second retaining flange is wider at its base than at its rim, said second retaining flange capturing lower end portions of said pair of perforated metal sheets when said inner cylindrical shell deforms said lower end portions of said pair of perforated metal sheets such that said lower end portions of said pair of perforated metal sheets conform to said second beveled surface as said inner cylindrical shell is crushed.

15. The packing system according to claim 13, wherein said pair of perforated metal sheets have first sawtooth cross section flanges at upper end portions thereof, said pair of perforated metal sheets have second sawtooth cross section flanges at lower end portions thereof, said first retaining flange has a first beveled surface which is beveled at a reentrant angle, said first retaining flange capturing said upper end portions of said pair of perforated metal sheets when said first sawtooth cross section flanges snap over said first retaining flange, and said second retaining flange has a second beveled surface which is beveled at a reentrant angle, said second retaining flange capturing said lower end portions of said pair of perforated metal sheets when said second sawtooth cross section flanges snap over said second retaining flange.

16. The packing system according to claim 11, wherein the stuffing box has a gland fastener bolt attached to the valve at each side of the stuffing box, the packing system further comprising:

a gland yoke being split into two halves that can be releasably clamped together by screws, said gland yoke having an internal groove configured to capture said top flange of said upper packing cup, half of said internal groove being formed in each of said two halves of said gland yoke, said internal groove capturing said top flange of said upper packing cup when said two halves of said gland yoke are brought together with said top flange of said upper packing cup being in registry with each half of said internal groove in each of said two halves of said gland yoke, said gland yoke having a pair of passages through which the gland fastener bolts can pass, whereby turning nuts threadedly engaged to the gland fastener bolts will push said upper packing cup further into the stuffing box when the gland fastener bolts pass through said pair of passages and the nuts are in contact with said gland yoke.

17. The packing system according to claim 16, wherein said first retaining flange has a first beveled surface such that said first retaining flange is wider at its base than at its rim, said first retaining flange capturing upper end portions of said pair of perforated metal sheets when said inner cylindrical shell deforms said upper end portions of said pair of perforated metal sheets such that said upper end portions of said pair of perforated metal sheets conform to said first beveled surface as said inner cylindrical shell is crushed, and said second retaining flange has a second beveled surface such that said second retaining flange is wider at its base than at its rim, said second retaining flange capturing lower end portions of said pair of perforated metal sheets when said inner cylindrical shell deforms said lower end portions of said pair of perforated metal sheets such that said lower end portions of said pair of perforated metal sheets conform to said second beveled surface as said inner cylindrical shell is crushed.

18. The packing system according to claim 16, wherein said pair of perforated metal sheets have first sawtooth cross section flanges at upper end portions thereof, said pair of perforated metal sheets have second sawtooth cross section flanges at lower end portions thereof, said first retaining flange has a first beveled surface which is beveled at a reentrant angle, said first retaining flange capturing said upper end portions of said pair of perforated metal sheets when said first sawtooth cross section flanges snap over said first retaining flange, and said second retaining flange has a second beveled surface which is beveled at a reentrant angle, said second retaining flange capturing said lower end portions of said pair of perforated metal sheets when said second sawtooth cross section flanges snap over said second retaining flange.

* * * * *